Jan. 20, 1970     E. L. PLATTE     3,490,797
CLIP ASSEMBLY
Filed Dec. 17, 1968
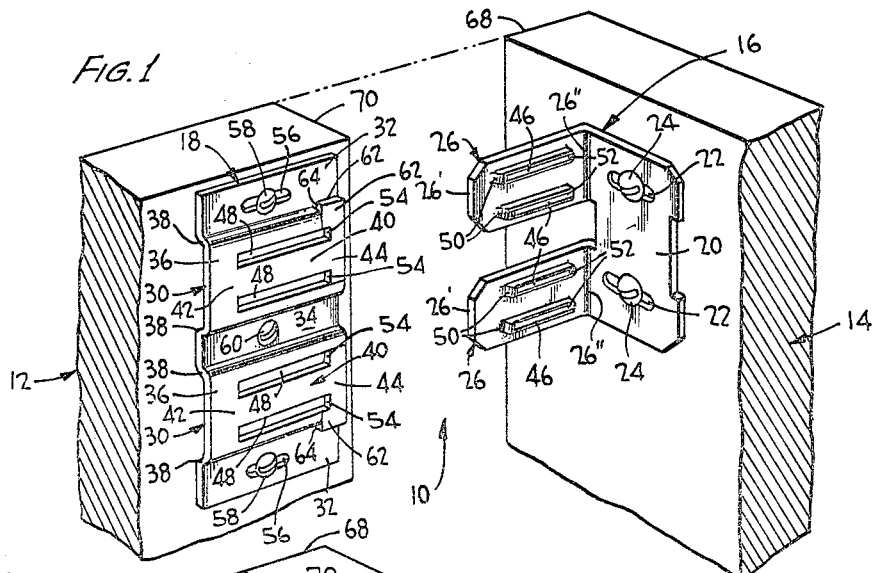
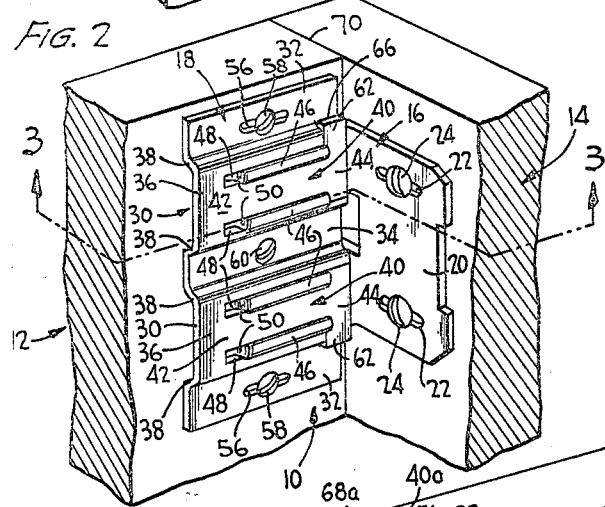
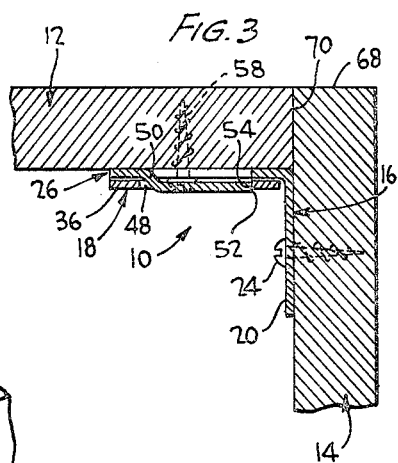
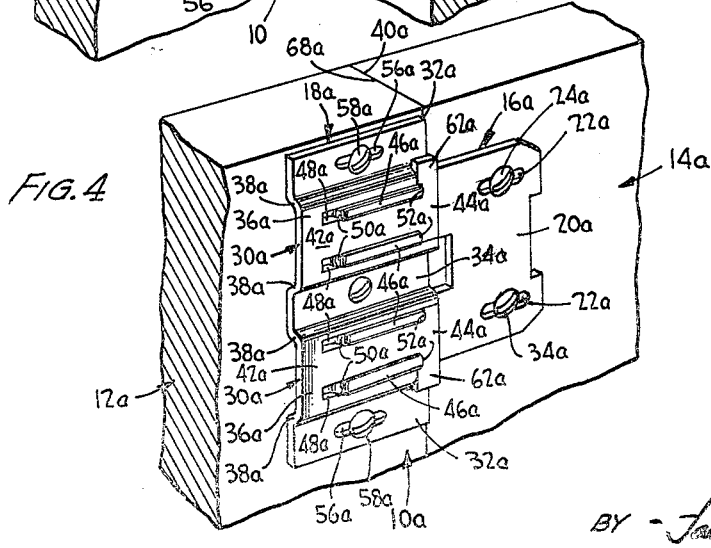
INVENTOR,
EUGENE L. PLATTE
BY Jacobi & Davidson
ATTORNEYS United States Patent Office 3,490,797
Patented Jan. 20, 1970

3,490,797
CLIP ASSEMBLY
Eugene L. Platte, 305 S. Howard,
Robinson, Ill. 62454
Filed Dec. 17, 1968, Ser. No. 784,324
Int. Cl. F16b 7/00, 5/00, 9/00
U.S. Cl. 287—20.924                                  11 Claims

ABSTRACT OF THE DISCLOSURE

A clip assembly including male and female clip elements having cooperating clip means, each including laterally spaced elongated locking means. After securement of the male and female clip elements to structural members to be joined, the structural members may be locked to each other without the need for additional tools.

---

This invention is related to a clip assembly and is related more particularly to a clip set for joining a pair of structural members such as elements forming portions of vanities, cabinets, shelves and the like.

The clip set of the instant invention has various applications. For example, in the manufacture of vanities or cabinets such as are commonly used in homes, it is desired that the structural members forming the same be "knocked down" for transportation, but readily assembled on the site. Preferably, such assembly can be accomplished by the end user without the need for any special tools even including such simple tools as screw drivers and the like. The ability to transport or ship such articles as vanities and the like in "knocked down" relationship significantly reduces shipping costs due to the reduction in bulk of the article. Yet, the end user must be capable of assembling the article relatively quickly since, if assembly were an exceptionally time-consuming project, then the savings in shipping costs would be quickly offset due to the expenses for labor. Therefore, a clip set which is capable of permitting quick assembly of "knocked down" articles such as vanities or the like must be extremely simple to use and, preferably, be capable of use without the need for any tools.

Additionally, such a clip set must be capable of providing extremely secure assembly of the structural members with no likelihood that the structural members will accidentally become disassembled by being jarred or bumped. Yet, it must be possible to readily disassemble the elements if it is again desired to "knock down" the article for movement to a new location.

Clip sets of the type discussed hereinabove may have other applications than for use in "knocked down" articles to be assembled on the site. For example, such clip sets may be used to secure various fixtures to walls, such as cabinets, shelves and the like and may also be used in mobile homes or marine use to prevent fixtures from jarring loose from a wall while being transported either on a boat or in a trailer. Additionally, such clip sets may find use in various prefabricated or precut articles such as prefabricated homes or the like as well as in larger articles such as trusses or bridges or the like.

Thus, it will be readily recognized that clip sets of the type with which the instant application is concerned may have various and sundry uses and may be manufactured of various materials in different sizes and strengths depending upon the particular use to which the clip set is to be put. Yet, regardless of the use, size or material of manufacture, clip sets of the type to which this application is directed have various common functional attributes. Therefore, it is a basic object of the instant invention to provide a clip set or assembly which satisfies all of these common important requirements and yet, which by variation of size and material of manufacture, may be utilized in a variety of situations.

In this regard, it is an important object of the instant invention to provide a clip set including male and female clip elements which may be separately secured to structural members to be later assembled on the site, wherein the assembly procedure does not require the use of any tools.

Further, the instant inventive concepts contemplate the provision of a clip assembly which, once the structural members are secured together thereby, will provide excellent supporting characteristics capable of carrying substantial loads without accidental disassembly. In this same vein, the clip assembly of the instant invention is such that the structural members will not separate accidentally when the clip assembly is subjected to any unusual shock such as a sudden jarring action that may be experienced in a mobile home passing over a large bump or a sudden jarring action that may be experienced by an individual accidentally falling against the structural members which are secured together by the clip assembly of the instant invention. Moreover, the clip assembly of this invention provides elongated, laterally spaced contact between the male and female portions of the clip assembly whereby unusually excellent functional properties are realized.

Yet another object of the instant inventive concepts is the provision of a clip assembly wherein the individual male and female clip elements may be secured to the structural members in a manner which permits slight adjustment to insure proper alignment in the event the structural members are not identical to other structural members used for the same purpose.

Additionally, it is an important object of this invention to provide a clip assembly which, while insuring secure joining of structural members when the male and female clip elements are in assembled relationship, permits disassembly of the structural elements either by the use of a simple special tool for this purpose or even by the use of an ordinarily available tool such as a screwdriver or the like.

Basically, the primary objects of the instant invention include the provision of a clip assembly which is simple and inexpensive to manufacture since such assemblies must be capable of production in large numbers at low cost, the provision of a clip assembly which is sturdy and durable in construction since such assemblies must be capable of taking relatively large loads, and the provision of a clip assembly which is highly reliable in use since such assemblies must insure that the structural members joined thereby will not become accidentally separated.

Other and further objects reside in the combination of elements, arrangement of parts and features of construction. Still other objects will in part be obvious and in part be pointed out as the description of the invention proceeds and as shown in the accompanying drawing wherein:

FIGURE 1 is an exploded fragmentary view showing typical male and female clip elements of a clip set according to one embodiment of the instant inventive concepts secured to fragments of structural members which are to be joined in a right angular relationship with respect to each other;

FIGURE 2 is a view of the fragmentary portions of the structural members shown in FIGURE 1 with the male and female clip elements in assembled relationship;

FIGURE 3 is a transverse cross-sectional view taken substantially on lines 3—3 of FIGURE 2; and FIGURE 4 is a view similar to FIGURE 2 showing a modified form of clip set according to the instant inventive concepts in assembled relationship joining structural members in end-to-end relationship with respect to each other.

Like reference characters refer to like parts throughout the several views of the drawing.

Referring now to the drawing in general, and more particularly to FIGURES 1–3, a clip set or assembly according to one embodiment of the instant inventive concepts to be utilized in joining structural members in a right angular relationship with respect to each other is designated generally by the reference numeral 10 with fragmental portions of the structural members to be joined thereby being designated by the reference numerals 12 and 14. It is to be understood that the structural members 12 and 14 may form various parts of different articles. For example, members 12 and 14 may be two wall portions of a vanity to be shipped in "knocked down" relationship. Alternatively, member 14 may be a wall to which a shelf 12 is to be attached either in an ordinary home or in a mobile home or on a boat. Other similar applications of a clip assembly according to the instant inventive concepts will be readily apparent to those with ordinary skill in the art.

It will be readily understood that while a single clip assembly 10 has been shown in the drawing as illustrative, it will be common to use a plurality of spaced clip assemblies to join structural members to each other, the number and spacing of the clip assemblies depending upon the load to be carried and the length of the structural members to be joined.

Each clip assembly 10 comprises basically a male clip element designated generally by the reference numeral 16 and a female clip element designated generally by the reference numeral 18.

The male clip element 16 includes supporting portions 20 for securing the same to one of the structural members, in this instance the member 14. Securement of the male clip element 16 to the structural member 14 may be accomplished in various manners, a preferred construction being shown in the drawing as including a pair of spaced elongated slots 22 defined through the supporting portions 20 for reception of fastening members, in this instance screws 24, smaller in cross-section than the length of the slots to allow for adjusting the relationship of the male clip element 16 on the structural member 14 as desired.

The male clip element 16 further includes at least one male clip means integrally connected to the supporting portions 20, and preferably includes a pair of male clip means 26 in the form of elongated tongue means extending from, and integrally secured to, the supporting portions 20 to form a generally U-shaped male clip element with the male clip means 26 being in the form of leg elements having bevelled leading ends 26′ and trailing ends 26″ joined by a connecting portion which in this instance corresponds to the supporting portions 20. In the embodiment of FIGURES 1–3, the male clip means 26 extend in a plane generally normal to the plane of the supporting portions 20 of the male clip element 16 to provide for right-angular joining of the structural members 12 and 14 in a manner to be described in more detail hereinafter. In the embodiment of FIGURE 4, wherein similar parts have been designated by the same reference numeral followed by the suffix a, the male clip element 16a is substantially identical to the male clip element 16 of the embodiment of FIGURES 1–3, with the exception that the male clip means 26a each extend in generally the same plane as the supporting portions 20a to permit joining of structural members 12a and 14a in end-to-end relationship. This is the only distinction between the clip assembly 10a and the clip assembly 10 since the female clip element 18a in the embodiment of FIGURE 4 is identical to the female clip element 18 in the embodiment of FIGURES 1–3. The only other difference between the clip assemblies 10 and 10a is in their manner of attachment to the structural members to be joined as will be explained in further detail hereinafter.

While clip assemblies have been shown in the drawing for end-to-end and right-angular joining of structural members, it will be readily recognized that such showings are illustrative and any angular relationship between the structural members may be provided by angularly disposing the male clip means with respect to the supporting portions therefor at the proper relationship.

The female clip element 18 also includes supporting portions and at least one female clip means 30 integrally secured thereto. In the embodiment of the drawing, two such female clip means 30 are shown to cooperate with the two male clip means 26 on the male clip element 16. Thus, in the embodiment shown in the drawing, the supporting portions of the female clip element 18 include end supporting portions 32 and a central supporting portion 34 with one female clip means 30 being defined between each end supporting portion 32 and the central supporting portion 34.

Each female clip means 30 comprises a pocket dimensioned to receive the tongue means of the male clip means 26 therein in a manner to be described in more detail hereinafter. The pocket is formed from offset portions 36 parallel to the supporting portions 32, 34, and integrally connected thereto by bent portions 38.

Spring finger means 40 are defined in the offset portions 36 of each female clip means 30 with the spring finger means being resiliently secured to the offset portions 36 at one end 42 and having a freely extending opposite end portion 44. The spring finger means 40 are adapted to overlie the tongue means of the male clip means 26 in the assembled relationship of the male and female clip elements 16, 18 in a manner described in more detail hereinafter to form part of the aforementioned pocket for the tongue means.

Cooperating locking means are defined on the male and female clip means. The locking means includes a pair of elongated protuberances 46 defined on the tongue means of each male clip means 26 and a pair of corresponding elongated channels 48 defined on opposite sides of each spring finger means 40.

The protuberances 46 are preferably pressed directly from the material of the tongue means and, as will be seen from the drawing, extend generally longitudinally of the tongue means in laterally spaced relationship. The leading ends of the protuberances each having camming portions 50 and the trailing ends of the protuberances each have what may be referred to as "planar locking edge portions" 52.

The spring finger means 40 are generally T-shaped with end portions 44 terminating in a cross-bar. The channels 48 are defined on opposite sides of the staff of the T in the offset portions 36 of each female clip means 30 with portions of the cross-bar of the T extending transversely across one end of each channel 48 and including what may be referred to as "cooperating planar locking edge portions" 54.

As will be described in more detail hereinafter, the cooperating planar locking edge portions 54 at the ends of the channels 48 engage against or lock with the planar locking edge portions 52 at the trailing ends of the protuberances 46 in the assembled relationship of the male and female clip elements 16, 18 to preclude accidental disassembly of the clip set and thereby of the structural members 12, 14.

The female clip element 18 is preferably secured to its structural member, in this instance, the structural member 12, by a pair of elongated slots 56 defined in the end supporting portions 32, these slots being adapted to receive therethrough fastening means such as screws 58 smaller in cross-section than the length of the slots, with the central supporting portion 34 of the female clip element 18 having an aperture (not visible in the drawing) defined therethrough of the general cross-section of the fastening means, in this instance the screw 60, that is to be secured therethrough. In this manner, some adjustability of the positioning of the female clip element 18 on the structural member 12 may be accomplished after the screws 58, 60 have been secured through the supporting portions of the female clip element 18 and into the structural member 12.

In order to permit disassembly of the clip set 10 to enable separation of the structural members 12, 14 when desired, means are provided to facilitate lifting the spring finger means 40 sufficiently to disengage the locking means whereby each of the tongue means 26 may be withdrawn from its associated pocket in the female clip means 30. To this end, portions 62 of the cross-bars of the T-shaped spring finger means 40 are extended transversely beyond the two outside channels 48 in the direction of the end supporting portions 32 of the female clip element 18. The bent portions 38 are cut-away, as shown at 64, in these locations to define a space for reception of these extended portions 62 of the cross-bars. The extended portions 62 terminate slightly short of the end supporting portions 32 of the female clip element 18 to provide a space 66 into which the bevelled end of a screwdriver or the like may be inserted to lift the spring finger means 40. Preferably, a specially designed tong-like tool (not shown) is provided for simultaneously lifting both spring finger means 40 on a female clip element 18.

If desired, the extended portions 62 of the cross-bars may be bent (not shown) slightly away from the plane of the end supporting portions 32 of the female clip element 18 to enlarge the space 66, but this is generally not found to be necessary.

The use and operation of the clip assembly 10 to join structural members 12, 14 at right angles to each other will now be readily understood. The male clip element 16 is secured to the structural member 14 by the screws 24 through the slots 22 of the supporting portions 20. Generally, the male clip element 16 is arranged so that the tongue means of the male clip means 26 is spaced sufficiently from the edge 68 of the structural member 14 to accommodate the structural member 12 when the parts are assembled. Adjustability of the positioning of the male clip element 16 on the structural member 14 may be accomplished due to the elongated nature of the slots 22.

The female clip element 18 is secured to the structural member 12 by screws 58, 60 passed through slots 56 in the end supporting portions 32 and the aperture (not visible in the drawing) in the central supporting portion 34 of the female clip element 18, respectively. The female clip element 18 has been shown as secured to the structural member 12 in slightly spaced relationship to its edge 70 to accommodate the thickness of the supporting portions 20 of the male clip element 16 as will be seen in the assembled relationship shown in FIGURES 2 and 3.

The various elements are dimensioned so that, in the assembled relationship when the tongue means of the male clip means 26 has been inserted into the pocket defined by the female clip means 30, the aforementioned locking means are superimposed, that is, the cooperating planar locking edge portions 54 on the cross-bar of the spring finger means 40 of the female clip means 30 seat against the planar locking edge portions 52 on the trailing ends of the protuberances 46 on the tongue means of the male clip means 26 to preclude withdrawal of the male clip means 26 from the female clip means 30 and to securely join the structural members 12 and 14. The camming portions 50 of the protuberances 46 assist in lifting the spring finger means 40 during the assembly procedure while the resilient connections at 42 cause the spring finger means 40 to return to their normal position and lock the protuberances 46 within the channels 48.

From the above explanation it will be seen that, once the male and female clip elements 16, 18 have been secured to the structural members 14, 12, respectively, the structural members may be subsequently joined in a right angular relationship without the need for any further tools by merely engaging the male and female clip means 26, 30, respectively. Thus, for example, if a vanity is shipped in "knocked down" relationship, it may be readily assembled on the site with no tools being necessary. Yet, the securement of the structural members is such that accidental disassembly between the structural members will not occur even if the structural members are subjected to some sudden shock or jarring action.

On the other hand, the structural members may be disassembled if desired by merely lifting the spring finger means 40 in the manner described above.

The clip assembly 10a shown in FIGURE 4 will be used in an obvious fashion from the above explanation of the use of the clip assembly 10, the only difference being that the clip assembly 10a is constructed so as to arrange for joining structural members 12a, 14a in end-to-end relationship as shown in FIGURE 4.

A unique feature of the clip assembly of this invention is the extremely large bearing area provided between the engaging portions of the male and female clip elements. As pointed out previously, and as will be seen from the drawing, each of the protuberances 46 is elongated, the length preferably being at least four times the width or even more if desired. This ratio is not critical, but illustrates the enlarged bearing area afforded by the clip set of this invention. Moreover, each male clip means 26 includes a pair of transversely spaced protuberances 46 thereby minimizing or eliminating lateral "play" in the assembled clip set, a feature which is even further magnified by the use of two male and female clip means in each clip assembly as shown in the drawing. While the instant invention contemplates the use of clip sets having only a single cooperating male and female clip means or even clip sets having three or more cooperating male and female clip means, the arrangements shown in the drawing have been found optimum for most applications.

It will now be seen that there is herein provided an improved clip assembly which satisfies all of the objectives of the instant inventive concepts, and others, including many advantages of great practical importance and commercial utility. The clip assembly is simple and inexpensive to manufacture, has numerous utilities, is sturdy and durable in construction, and is highly reliable in use.

Accordingly, what is claimed is:

1. A clip assembly for joining a pair of structural members, said clip assembly comprising a male clip element and a female clip element, said male clip element including supporting portions for securing the same to one of the structural members and further portions defining at least one male clip means, said female clip element including supporting portions for securing the same to the other of the structural members and further portions defining at least one female clip means, said male clip means comprising portions defining an elongated tongue means having leading and trailing ends, said female clip means comprising portions defining a pocket dimensioned to receive said tongue means therein, said pocket being partially defined by a spring finger means having one resiliently secured end portion and spaced free end portions overlying said tongue means when said tongue means is inserted into said pocket in said female clip means in the assembled relationship of said male and female clip elements, and cooperating locking means defined on said male and female clip means, said locking means including a pair of elongated protuberances defined on said tongue means of said male clip means, said protuberances each having leading and trailing ends with said protuberances extending generally longitudinally of said tongue means and being transversely spaced from each other on said tongue means, and a pair of corresponding elongated channels defined on opposite sides of said spring finger means of said female clip means, said protuberances each having locking edge portions and said channels each having cooperating locking edge portions, said male and female clip means being dimensioned to superimpose said channels and said protuberances when said tongue means is fully inserted into said pocket in said female clip means in the assembled relationship of said male and female clip elements with said cooperating locking edge portions of said channels engaging against said locking edge portions of said protuberances to prevent accidental withdrawal of said tongue means from said pocket thereby locking said male and female clip elements against accidental disassembly, said spring finger means being generally T-shaped with said free end portion including a cross-bar, portions of said cross-bar extending transversely across one end of each of said channels and including generally planar edge portions defining said cooperating locking edge portions of said channels, said trailing end of each protuberance including generally planar edge portions extending transversely of said tongue means and defining said locking edge portions of said protuberances.

2. The clip assembly of claim 1, including portions of said female clip means offset sufficiently from said supporting portions thereof by bent portions to receive said tongue means of said male clip means thereunder, said spring finger means being defined in said offset portions.

3. The clip assembly of claim 2 wherein portions of said cross-bar extend transversely beyond at least one of said channels, said bent portions of said female clip element being cut-away to define a space for reception of the extended portions of said cross-bar, said extended portions of said cross-bar terminating in slightly spaced relationship with respect to said supporting portions of said female clip element to permit insertion therebetween of a tool designed to lift said spring finger means for disassembly of said male and female clip elements.

4. The clip assembly of claim 2 including camming portions at said leading end of each protuberance.

5. The clip assembly of claim 1 wherein said male clip includes a pair of laterally spaced male clip means integrally secured to said supporting portions of said male clip element and said female clip element includes a pair of female clip means integrally secured to said supporting portions of said female clip element, each of said female clip means being adapted to cooperate with one of said male clip means on assembly of said male and female clip elements.

6. The clip assembly of claim 5 wherein said male clip element comprises a generally U-shaped member including a pair of laterally spaced leg elements each defining a male clip means and a portion connecting said leg elements at one end thereof, said connecting portion defining said supporting portions of said male clip element, and wherein said female clip element includes a pair of end supporting portions and a central supporting portion, a female clip means being defined between each end supporting portion and said central supporting portion.

7. The clip assembly of claim 6 wherein said supporting portions of said male clip element include a pair of laterally spaced elongated slots for receipt therethrough of fastening means smaller in cross-section than the length of said slots for adjustably securing said male clip element to one of the structural members.

8. The clip assembly of claim 6 wherein said end supporting portions of said female clip element each include an elongated slot for receipt therethrough of fastening means smaller in cross-section than the length of said slots and said central supporting portion of said female clip element includes an aperture of the general cross-section of the fastening means for adjustably securing said female clip element to one of the structural members.

9. The clip assembly of claim 1 wherein said male clip element comprises a generally U-shaped member including a pair of laterally spaced leg elements each defining a male clip means and a portion connecting said leg elements at one end thereof, said connecting portion defining said supporting portions of said male clip element.

10. The clip assembly of claim 9 wherein said connecting portion of said male clip element extends in a plane generally normal to the plane of said leg elements of said male clip element for joining structural members at a right angular relationship with respect to each other.

11. The clip assembly of claim 9 wherein said connecting portion of said male clip element extends in generally the same plane as said leg elements of said male clip element for joining structural members in end-to-end relationship with respect to each other.

References Cited

UNITED STATES PATENTS

| | | | |
|---|---|---|---|
| 1,069,994 | 8/1913 | Anderson | 287—20.925 |
| 1,281,613 | 10/1918 | McBreen. | |
| 2,184,650 | 12/1939 | Roseman. | |
| 2,552,805 | 5/1951 | Murphy | 24—221 |
| 2,620,248 | 12/1952 | Mutchnik | 287—20.3 |
| 2,789,839 | 4/1957 | Siebert | 285—7 |
| 3,244,437 | 4/1966 | Belicka et al. | 285—7 |
| 3,113,358 | 12/1963 | Zell et al. | |
| 3,403,641 | 10/1968 | Baker | 108—152 |

FOREIGN PATENTS

| | | |
|---|---|---|
| 1,146,858 | 5/1957 | France. |
| 1,221,760 | 1/1960 | France. |

EDWARD C. ALLEN, Primary Examiner

U.S. Cl. X.R.

108—152